Sept. 13, 1966  R. F. DI GIORGIO  3,273,161
FUEL ECONOMIZER AND EXHAUST GAS PURIFIER DEVICE
Filed March 3, 1966  3 Sheets-Sheet 1
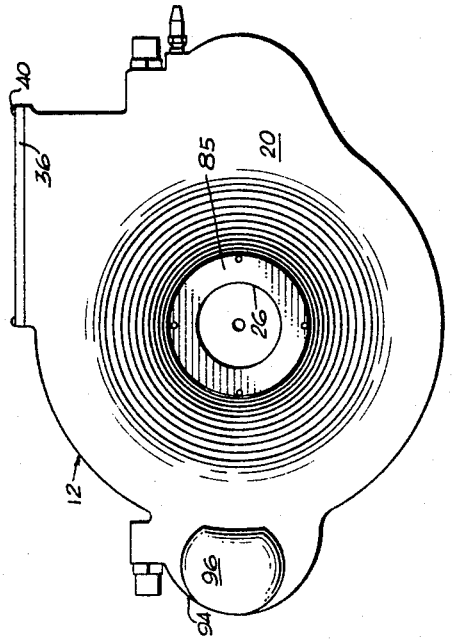
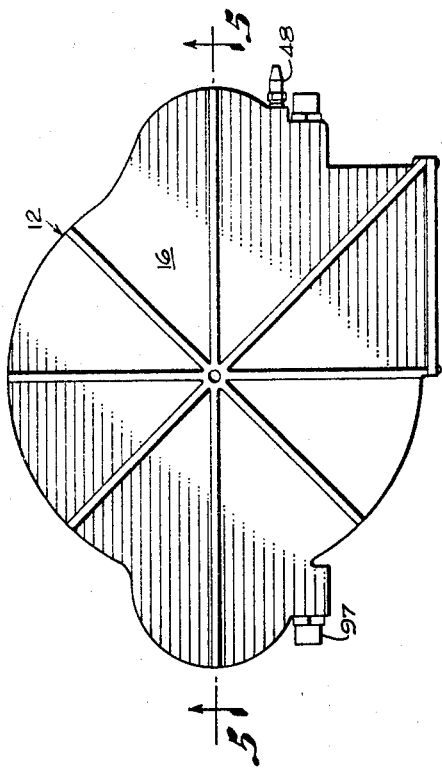
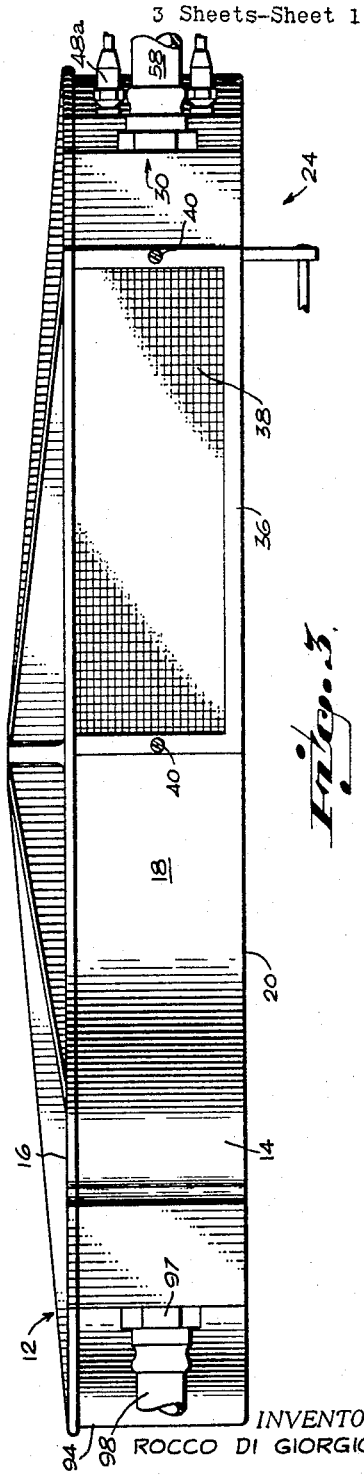
INVENTOR.
ROCCO DI GIORGIO
BY John Cyril Malloy
ATTORNEY.

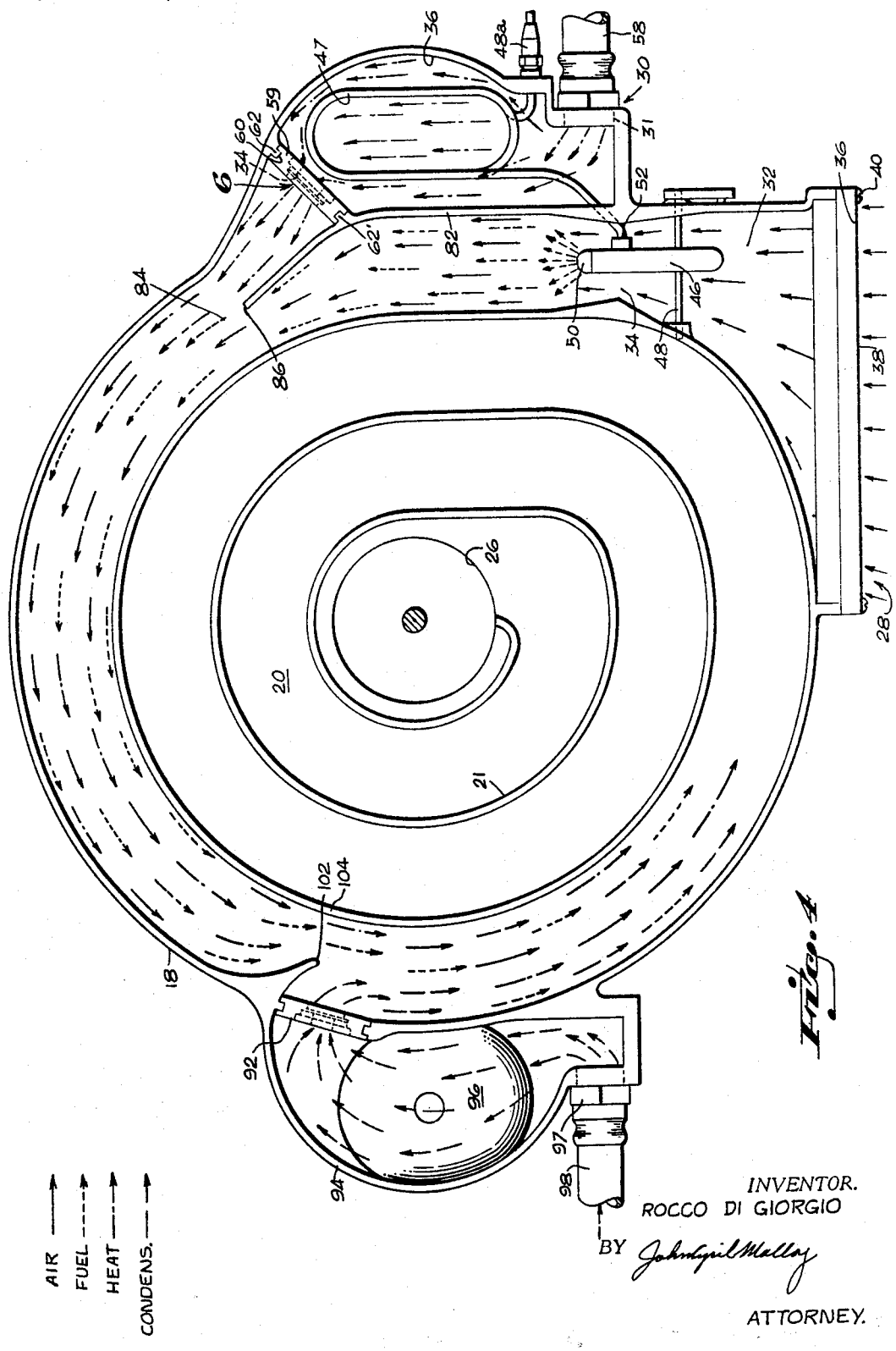

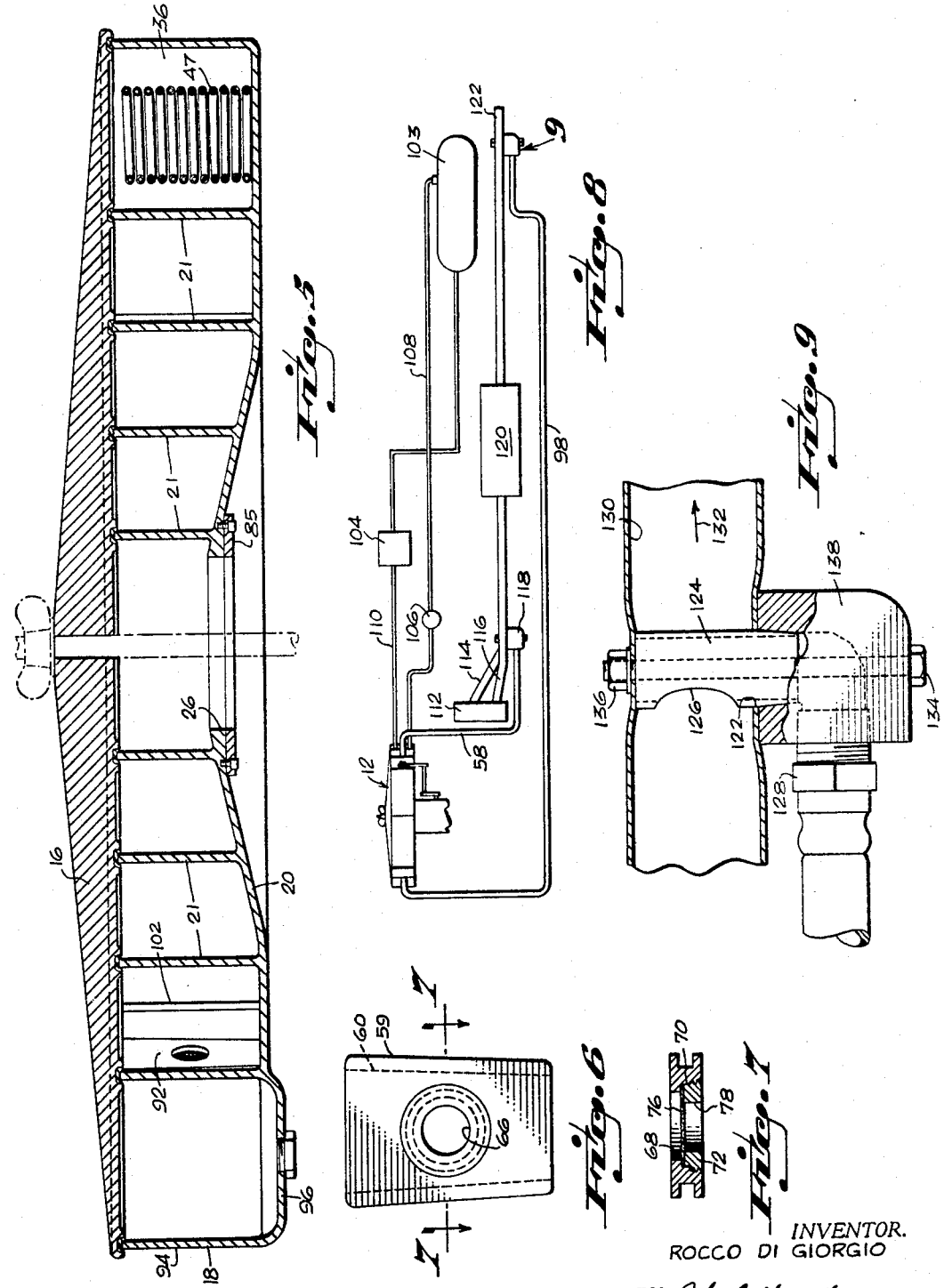

United States Patent Office
3,273,161
Patented Sept. 13, 1966

3,273,161
FUEL ECONOMIZER AND EXHAUST GAS
PURIFIER DEVICE
Rocco F. Di Giorgio, Miami, Fla., assignor to Keller
Industries, Inc., Miami, Fla.
Filed Mar. 3, 1966, Ser. No. 531,533
16 Claims. (Cl. 123—119)

This invention relates to a fuel economizer and an exhaust gas purifier device for vehicles driven by an internal combustion engine utilizing a carburetor.

As is perhaps well known, in the past there have been numerous structures designed for the purpose of functioning to improve fuel mileage and purify the exhaust of internal combustion engines which require carburetion; however, such devices have not in the past been satisfactory. It is an object of this invention to provide a fuel economizer and exhaust gas purifier for such engines which is relatively inexpensive to manufacture, simple in construction, and which is designed to improve the fuel economy of an engine by utilizing and, consequently, purifying the exhaust gas of the engine, the said device being adapted to be connected in the fuel line intermediate the carburetor and the fuel pump.

It is another object of this invention to provide an exhaust gas purifier and fuel economizer which includes a housing having a spiral type track or course therein arranged to mix an incoming stream of atmosphere with a metered volume of exhaust gases and a supply of preheated atomized fuel injected into the stream prior to the carburetor throat and to supplement the said flow in the stream with cooled exhaust gas and condensate of the exhaust gases to mix with the stream being directed to the carburetor to effect an increased combustion of the fuel supply utilized by the engine.

In accordance with these and other objects which will become apparent hereinafter, the instant invention will now be described with reference to the accompanying drawings in which:

FIG. 1 is a plan view of the exhaust gas purifier and fuel economizer of the instant invention;

FIG. 2 is a bottom plan view of the device of FIG. 1;

FIG. 3 is a front elevation view which is enlarged and which illustrates the device of FIG. 1;

FIG. 4 is an enlarged plan view of the fuel economizer and exhaust gas purifier of FIG. 1 as seen with the top or cap of the device removed and illustrating the interior course of the gases to be subjected to carburization;

FIG. 5 is an elevation view in cross section taken along the plane indicated by the line 5—5 of FIG. 1 and looking in the direction of the arrows;

FIG. 6 is a front elevation view of that element of FIG. 4 indicated by the arrowed line 6;

FIG. 7 is a view in cross section taken along the plane indicated by the line 7—7 of FIG. 6 and looking in the direction of the arrows;

FIG. 8 is a schematic view illustrating the instant device in relation to a fuel tank, conductor lines from the fuel tank, and the exhaust of an engine; and FIG. 9 is a view which is partly broken away and shown in cross section to illustrate a pick up device designed for the purpose of picking up gases in the exhaust system of the engine to which the fuel economizer and exhaust gas purifier is mounted.

Referring to the drawings, wherein like reference characters designate like or corresponding parts throughout the different views, and referring particularly to FIG. 1, there is shown a housing generally designated by the numeral 12 which includes a body portion 14, which is generally cylindrical as seen in plan, and a lid or cap portion 16 which is suitably fastened over the upstanding walls 18 of the body 14 and secured in position by suitable means so that separator or barrier walls 21 arranged on the floor 20 of the housing define a closed spiral path through the housing when it is capped and which will lead from a peripheral inlet opening, generally designated by the arrow 24, to a central outlet opening 26 through the generally spiral course or path, the general direction and shape of which is seen in FIG. 4.

Referring to the inlet opening generally indicated by the arrow 24, it is seen that it in effect comprises a first and a second mouth generally designated by the numerals 28 and 30 respectively. Referring first to the mouth 28 it provides a funnel or scoop type path 32 leading to a constricted throat area 34 from an enlarged lip opening 36, which is preferably provided with a screened filter cover 38, held in position by suitable means such as screws 40. The constricted throat provides the characteristics of a venturi type flow to an incoming fluid stream; and a fuel injector 46 is suitably mounted in the mouth so that the nozzle portion 50 of the fuel injector is on the downstream side of the venturi to inject atomized fuel from a supply which will be described hereinafter into the main stream of air flow which are indicated by the solid arrows throughout the drawing in a metered amount dependent on the angular position of the control pivot pin 48, which position is responsive to the position of the accelerator pedal and/or the carburetor throttle valve as seen in FIG. 8.

The second mouth 30 includes an entrance orifice 31 as well as an exit orifice 34 with an enlarged cavity 36 therebetween. Within the cavity, in the preferred embodiment disclosed herein, a separated or spread coil of metal tubing 47 is provided, the said coil being connected at one end to a fitting 48a which leads from a fuel reservoir and at the other end 52 to the inlet port of the fuel injector device 46. The orifice 31 is provided with a fitting and a tube 58 which leads to the hot gases manifold of the engine on which the device is installed to conduct a supply of the heated gases into the cavity 36 to pre-heat the fuel flowing to the injector nozzle. The orifice 34 is spanned or bridged by a member, shown in FIG. 6, which includes a gate 59 having vertical edges provided with a groove 60 for companulate engagement with a pair of ribs 62 and 62' to guide the gate into the nestled position indicated in FIG. 4. As is apparent in FIG. 7, which shows the gate in cross section, a central hole or opening 66 is provided which is formed by a through bore 68 and a counter-bore 70 with the entrance to the counter-bore being threaded to accommodate a threaded insert 72 to captivate a screen 76 therein to diffuse the gases flowing through the gate and which is provided with a through bore 78, the size of which may be of a different diameter for a different insert and the particular diameter is selected dependent upon the particular type of engine to which the device is mounted for the purpose of limiting and controlling the heated exhaust gas volume limited to pass the said gate. The mouths of the inlet opening are divided by means of a septum 82 which is preferably curved to guide the gases from each of the mouths toward a point of confluence or an apex which is generally at approximately the position indicated by the numeral 84 to promote mixing of the two streams of gases. The distal edge or terminal edge 86 of the septum 82 is on about the bisectrix of the angles of approach of the two streams to the said point of confluence. The fuel in the first stream or the stream from the first mouth is indicated by the dashed line while the heated exhaust gases flowing through the second mouth are indicated by the dot-dash arrowed lines seen in FIG. 4. The legend for the aforesaid principal components or ingredients of the streams are shown at the upper left of FIG. 4.

As is apparent by the arrowed lines, the stream defined by the two streams is traveled in the closed path in a generally spiral form to the exit indicated in FIG. 2 by the numeral 26 and which is surrounded by an adapter plate 85 for accommodating it to the various size throats of the carburetors on which it may be installed.

Intermediate the flow there is provided an intermediate opening in the side wall 18 of the housing. This opening is also provided with a gate type member 92 which is of substantially similar construction to that illustrated in FIG. 6 for a purpose now to be described. The said opening is in a bowl-shaped reservoir defined by side walls 94 and a floor 96 with the said wall including an inlet port having a fitting 97 connected thereto for accommodating a tube 98 from the tail pipe of the exhaust system of a vehicle and arranged to flow the gases, shown in dash lines which are arrowed over a lower or recessed portion of the bowl so that condensate may be collected and the relatively cool gases flowed over the pool in the depressed portion and through the orifice 92 into the main stream earlier described. The depressed portion is provided with a drain recess as seen in FIG. 4 and FIG. 5. It is noted that a guidewall portion defining a venturi type of constricted passageway between the distal end 102 and the confronting wall 104 is defined and that this promotes the blending and merging of the main stream and the stream of cooled exhaust gases and condensate. It is thus apparent that the main stream with the mixed components thereof is constrained to travel the spiral path and thereafter enters the carburetor for carburization. The spiral path of the housing defined by the walls or barriers 21 promote mixing and expansion of the products to be combusted or the elements to be combusted on passage through the carburetor. Diffuser means may be provided in or adjacent the exit outlet from the instant device and of any suitable design.

Referring to FIG. 8, there is shown in schematic diagram the device 12 and its arrangement with respect to a fuel reservoir 103 and a fuel pump 104 including the check valve 106 in the conventional or auxiliary fuel line 108 which supplements the main fuel line 110, the said line 108 comprising the vapor line off the vent of the fuel reservoir.

The box indicated by the numeral 112 represents the engine with the manifold being indicated by the numeral 114 and 116 with the take-off being indicated at the numeral 118. The exhaust gases are, as is conventional, led through a muffler 120 and to the terminal end of a tail pipe 122 adjacent the end of which the pick up for the tail pipe, condensate and gases is arranged.

Referring to FIG. 9, a pick up structure which is satisfactory to tap gases from the exhaust system is illustrated. A hole 122 is provided in the side wall of the exhaust tubing into which a tube is passed in a diametrical direction, the tube being indicated by the numeral 124 and being provided in the upstream face thereof with an arcuate cutout 126 which provides a mouth to facilitate passage of gases into the interior of the tube which in turn is conducted past a fitting 128. It is noted that the diameter of the tube is less than that of the diameter of the pipe or exhaust pipe 130 in chief for the reason that it will permit of passage therearound of some of the gases in the downstream side indicated by the arrow 132. Means are provided such as the stove bolt 134 and nut 136 to draw this combination together through the use of the block 138 which in effect blocks and seals in fluid tight relation the tapped off gases through the secondary line.

It is thus apparent that the pre-heating provision of the fuel and the mixture afforded by the instant structure is of a new and novel development and it has been found that the said structure provides for improved gas mileage when installed on motor vehicles.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A fuel economizer and exhaust gas purifying device for attachment on a vehicle having an exhaust manifold for hot gases of combustion and a tail pipe system for the cooled gases and condensate of said exhaust gases and intermediate the fuel pump and the carburetor of an internal combustion engine of the type requiring carburization comprising; a closed housing of generally cylindrical form as seen in plan having an inlet opening, an intermediate opening and an exit opening and separator means in the housing to define a closed fluid path between the openings; a septum dividing the first opening into a first and second contiguous mouth, said first mouth having an enlarged lip opening and a throat of depthwise diminishing cross-sectional area, said second mouth having a main cavity with a first and a second orifice communicating with the cavity and the exterior of the housing and the closed fluid path respectively; said septum terminating in the fluid path along an edge which is on the bisectrix of the angle of effluent from the first mouth and the second orifice formed at the confluence of the fluid streams through the said mouths of the inlet opening; fuel injector means arranged in the throat of the first mouth to supply atomized fuel into air flowing into the said first mouth; fuel conductor means connected to the fuel injector means, said conductor means including a portion of heat exchanger configuration arranged in the cavity of the second mouth to pre-heat fuel traveling to the injector means; means in the first orifice to connect to a tube from the exhaust manifold of the engine to conduct the gases from the exhaust manifold of the engine into the cavity while still at an elevated temperature relative to the atmosphere; diffusion means arranged in spanning relation of the second orifice and sized to limit the flow of exhaust gases from the engine into the fluid path; the said device including means to mount the device with the exit opening in operative relation to the entrance throat of a carburetor of an internal combustion engine and with the lip opening of the first mouth of the inlet opening facing in a normal direction of the travel of the vehicle to develop a pressure in the throat of incoming ambient atmosphere which merges and mixes with the exhaust gases exiting through the second orifice from the second mouth into the fluid path; said fluid path tracing a generally spiral course as seen in plan to the exit port; said housing including a wall defining a bowl-shaped reservoir at the intermediate opening having an inlet hole and means to connect to a tube to conduct exhaust gases and condensate from the tail pipe into the reservoir, said hole being above the floor of the bowl-shaped reservoir and a portion of said wall of said bowl-shaped reservoir projecting into the closed fluid path to affect the fluid flow therein in adjacent space and the said wall having an exit port in communication between the reservoir and the fluid path so that gases and condensate are free to flow under the pressure in the tail pipe system into the fluid path to mix with the gases flowing therethrough; and diffusion means in the said exit port to limit the in-flow of the exhaust and condensate.

2. A device as set forth in claim 1 wherein distribution means are arranged in the exit opening for random distribution of the effluent through the cross-sectional area through the exit port for entrance into the throat of a carburetor.

3. A device as set forth in claim 1 wherein the said fuel injector nozzle includes means responsive to a remote accelerator pedal to meter the amount of fuel injected into the first mouth.

4. A device as set forth in claim 1 wherein screen type filter means are provided over the lip opening of the first mouth.

5. A device as set forth in claim 1 wherein the said conductor means configuration in the cavity comprises a coil which is expanded so that fluid flow may take place between the various turns of the coil on passage through the cavity to pre-heat the fuel being conducted therethrough.

6. A device as set forth in claim 2 wherein the said inlet hole and exhaust port in the wall of the bowl-shaped reservoir are substantially above the floor of the reservoir so that condensate may collect therein.

7. A device as set forth in claim 6 wherein the said bowl-shaped reservoir is provided with a drain recess.

8. A device as set forth in claim 1 wherein either or both of the said diffusion means comprise a removable gate including screen means as the diffuser element carried in the said gate wherein the said screen is held in place in a recess in the gate and a threaded insert plug is provided to compress the diffuser element into spanning relation across the opening in the gate to break up and limit particles from flowing through the said diffuser.

9. A device as set forth in claim 1 wherein the said inlet and intermediate ports are oppositely disposed on the housing and the said exit opening is arranged centrally of the housing so that fluid flow through the closed fluid path is adapted to mix streams entered into the housing from the inlet opening and the intermediate opening so that the said streams are intermixed thoroughly on reaching the exit opening.

10. In a fuel economizer and exhaust gas purifier device for an internal combustion engine having a carburetor and exhaust pipe, a generally cylindrical base having a central outlet opening for connection with the air intake of the carburetor, a generally cylindrical wall integral with and upstanding from the periphery of said base, and a cover removably secured to and over the rim of said wall to form a housing with said base and wall, first and second circumferentially-spaced inlets through said wall, said first inlet including a venturi throat through which ambient air passes into said housing, a connection to said second inlet to supply exhaust gas to said housing from the exhaust pipe of the engine, fuel injector means mounted in said venturi throat for supplying fuel to air entering through said first inlet, conduit means connected with said injector for supplying fuel thereto, said fuel-air mixture being blended with exhaust gas entering through said second inlet, in said housing, prior to passage of the blended mixture to said central outlet opening; and a third inlet in said wall for connection with the engine exhaust manifold to supply heated gas, said conduit means for supplying fuel to said injector, including a portion in said housing in heat exchange relation with gas entering said third inlet, said heated gas and fuel-air mixture being blended in said housing prior to admixture with exhaust gas entering said second inlet.

11. The device of claim 10, a first plate having a metering orifice therein, and means removably mounting said first plate in said housing adjacent said second inlet so that exhaust gas entering said housing first traverses said first metering orifice.

12. The device of claim 11, a second plate having a metering orifice therethrough, and means removably mounting said second plate in said housing in the path of heated air entering said third inlet, downstream of said portion and before confluence with ambient air entering from said first inlet, said portion comprising a coil.

13. The device of claim 11, said base being formed with a liquid collecting sump adjacent said second inlet and over which exhaust gas passes before traversing the orifice in said first plate.

14. The device of claim 10, and a spiral wall in said housing extending circumferentially and radially outwardly in a plurality of 360° turns, from said central outlet opening to said first and second inlets and forming with said base and cover a closed spiral passageway between said first and second inlets and said outlet opening.

15. The device of claim 10, said fuel injector being mounted in said venturi throat for pivotal adjustment about an axis normal to the direction of flow of ambient air therethrough, and means carried by said housing externally thereof for so adjusting said injector, by and in response to actuation of the accelerator pedal for the throttle of the carburetor.

16. The device of claim 10, and air filter means carried by said housing to extend over and across said first inlet to filter air entering therethrough to said housing.

References Cited by the Examiner

UNITED STATES PATENTS

| | | | |
|---|---|---|---|
| 1,456,933 | 5/1923 | Rasmussen | 123—119 |
| 1,476,942 | 12/1923 | Youngblood | 123—119 |
| 1,490,333 | 4/1924 | Lichtenthaeler | 259—4 |
| 1,766,671 | 6/1930 | Moore | 123—119 |
| 1,992,265 | 2/1935 | Weeks | 123—119 |
| 2,349,675 | 5/1944 | Pratt | 123—119 |
| 2,408,846 | 10/1946 | Golden et al. | 123—119 |
| 2,954,967 | 10/1960 | Johnson | 261—144 |
| 3,146,768 | 9/1964 | Osborne | 123—119 |
| 3,236,214 | 2/1966 | Johnson | 123—25 |

CARLTON R. CROYLE, *Primary Examiner.*

A. L. SMITH, *Assistant Examiner.*